Oct. 27, 1964 D. GOLD 3,154,272
QUICK DIVESTIBLE PARACHUTE HARNESS
Filed June 7, 1963 8 Sheets-Sheet 1

INVENTOR
DAVID GOLD
BY
ATTORNEYS

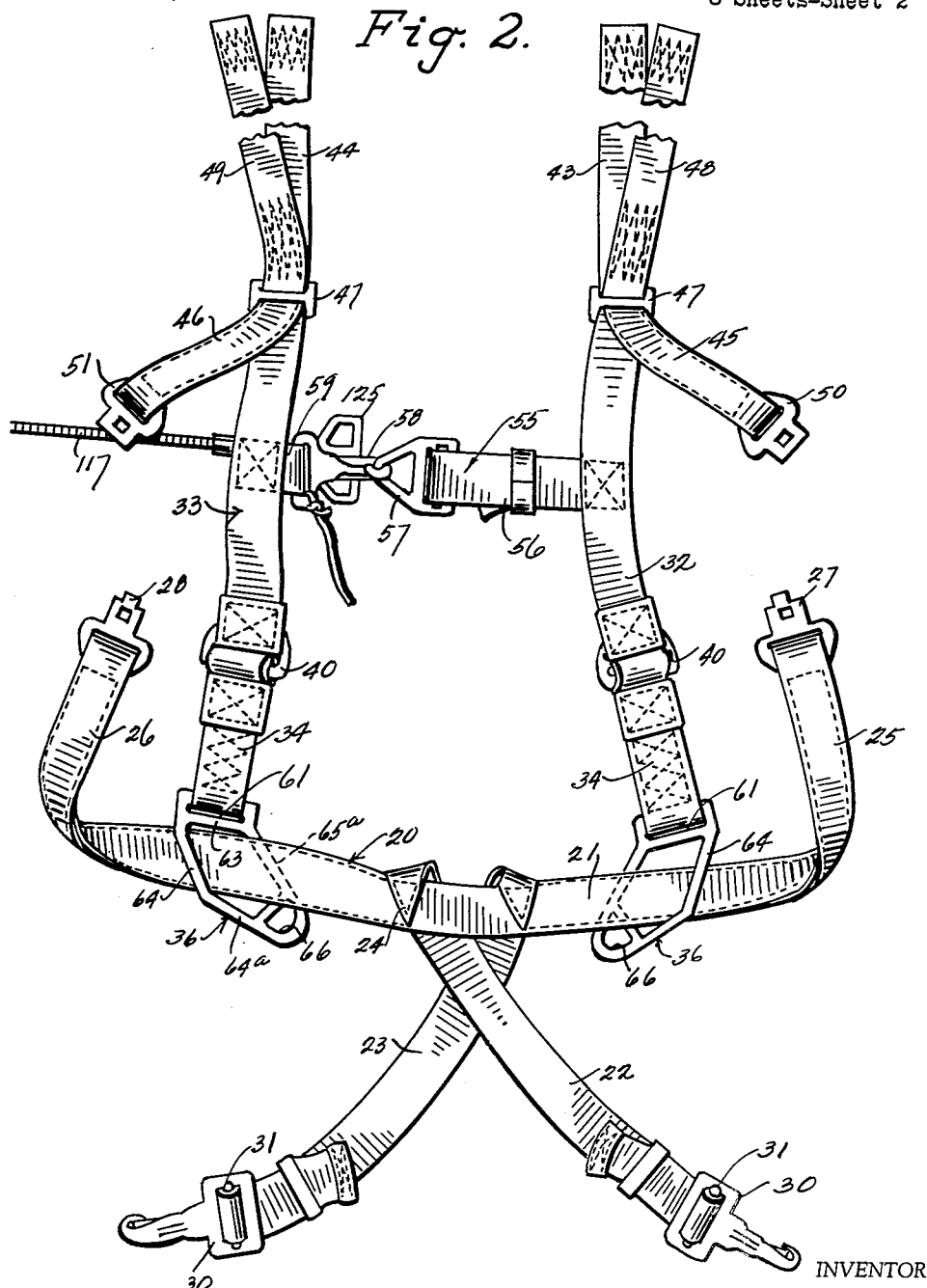

Oct. 27, 1964    D. GOLD    3,154,272
QUICK DIVESTIBLE PARACHUTE HARNESS
Filed June 7, 1963    8 Sheets-Sheet 3
*Fig. 5.*
*Fig. 6*
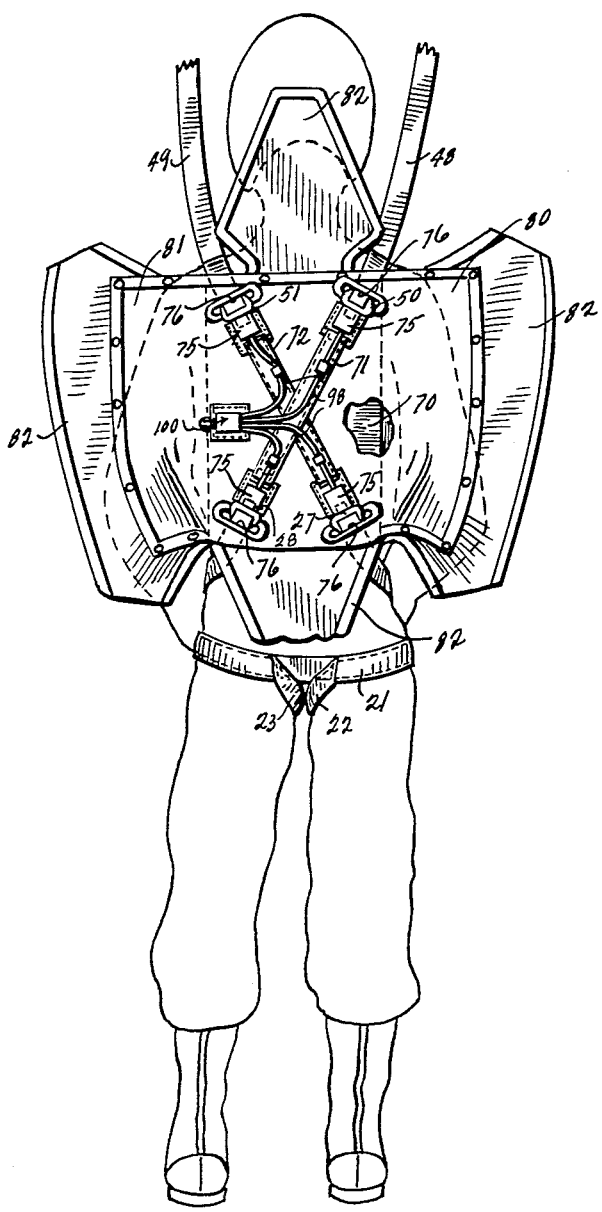
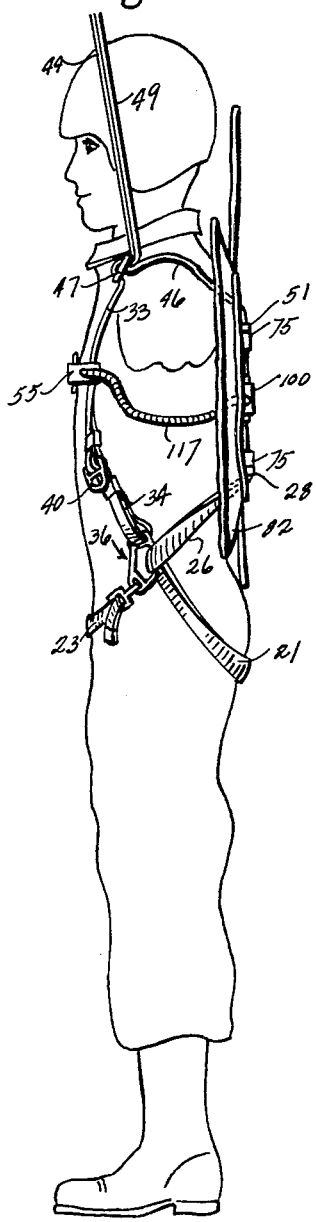
INVENTOR
DAVID GOLD
BY Rommel, Allen and Rommel
ATTORNEYS Oct. 27, 1964  D. GOLD  3,154,272
QUICK DIVESTIBLE PARACHUTE HARNESS
Filed June 7, 1963  8 Sheets-Sheet 4
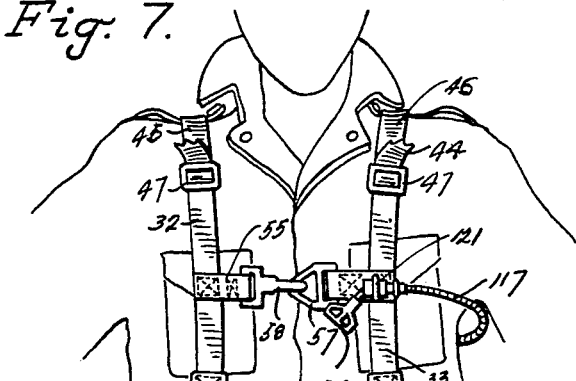
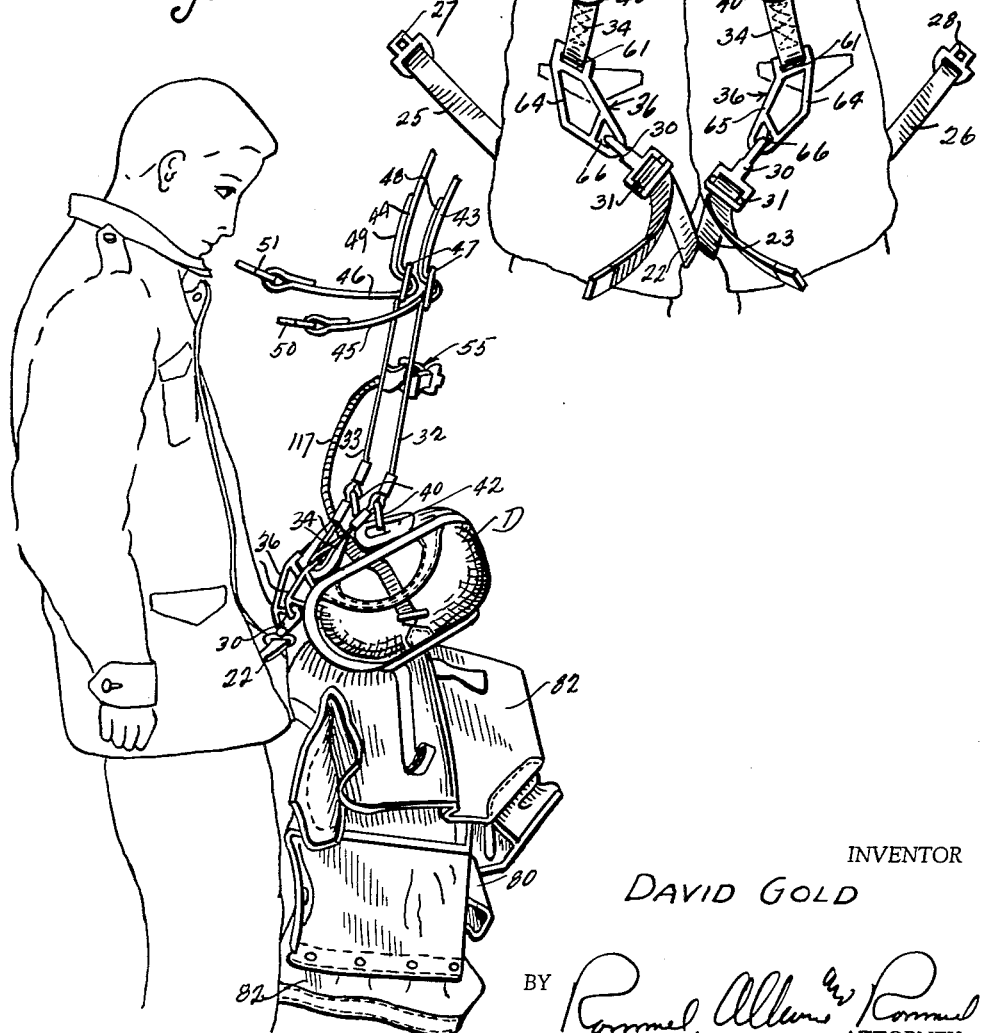
INVENTOR
DAVID GOLD
BY
ATTORNEYS

INVENTOR
DAVID GOLD

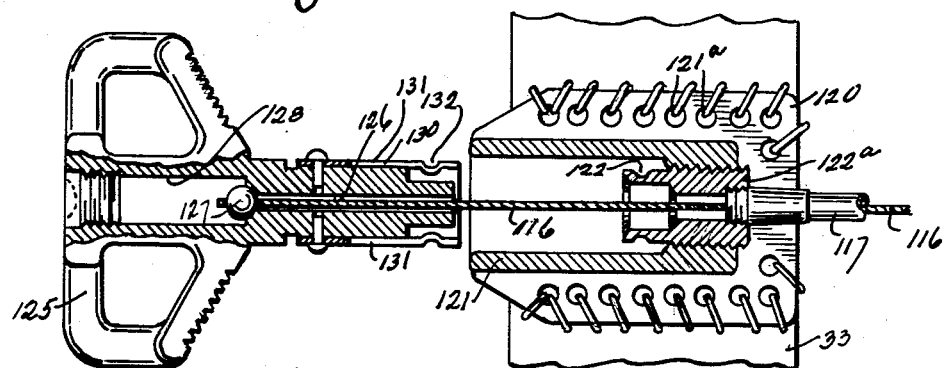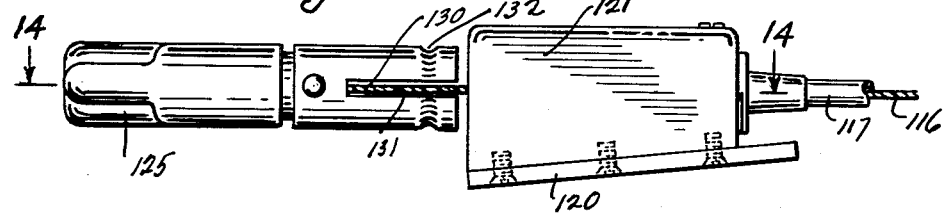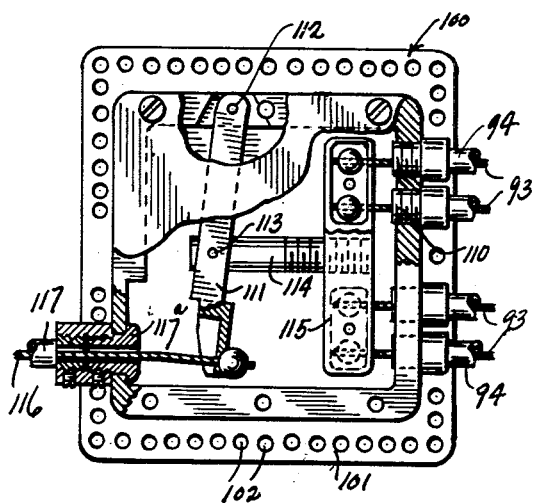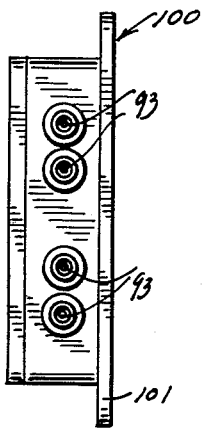

Oct. 27, 1964  D. GOLD  3,154,272
QUICK DIVESTIBLE PARACHUTE HARNESS

Filed June 7, 1963  8 Sheets-Sheet 7

INVENTOR
DAVID GOLD
BY
ATTORNEYS

Oct. 27, 1964

D. GOLD 3,154,272

QUICK DIVESTIBLE PARACHUTE HARNESS

Filed June 7, 1963

INVENTOR
DAVID GOLD

BY
ATTORNEYS

United States Patent Office 3,154,272
Patented Oct. 27, 1964

3,154,272
QUICK DIVESTIBLE PARACHUTE HARNESS
David Gold, Tujunga, Calif., assignor to Irving Air Chute Company, Inc., Lexington, Ky., a corporation of New York
Filed June 7, 1963, Ser. No. 286,898
21 Claims. (Cl. 244—151)

This invention relates to quick divestible troop back personnel parachute harness.

The need for a divestible parachute harness for paratroopers has become increasingly evident. Many fatalities have resulted to parachutists, during high winds, because of inability to free themselves of a powerfully tugging inflated parachute canopy. Water landings have also claimed their share of lives through drownings. Present parachute canopy design is such that it is becoming increasingly difficult to collapse canopies in high winds. It is therefore a purpose of the present invention to provide a quick divestible troop back personnel parachute harness adapted to free the wearer of harness, emergency pack, back pack, and combat equipment at the end of a jump.

It is an object of the present invention to provide a parachute harness the supporting webbing and features of which will conform as closely as possible to standard parachute harness design, with means associated therewith by which the harness can be quickly divested together with the canopy and emergency pack, upon landing.

A further object of this invention is the provision of an improved parachute harness, the fastener means for divestibility purposes being located at the back of the harness. This enables egress of the wearer's body through the rear portion of the harness inasmuch as the bulk of equipment will fall away from the front of the wearer.

In the drawings, wherein for the purpose of illustration have been shown different types of divestible harnesses:

FIGURE 2 is a developed view showing the harness, looking from the rear thereof towards the front of the harness.

Figure 4:
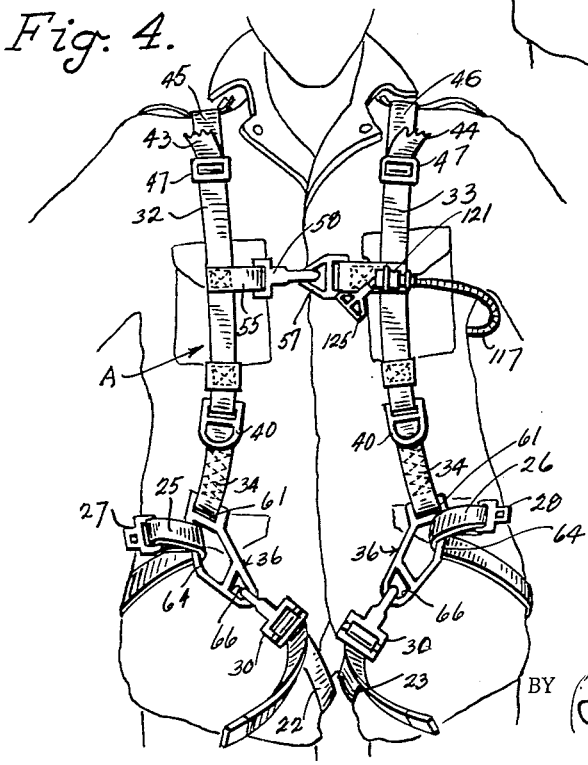
FIGURE 4 is a view of the harness showing the harness after operation of the release cable assembly to open the harness fastening means at the rear so that the wearer can be freed of the harness.
Figure 4A:
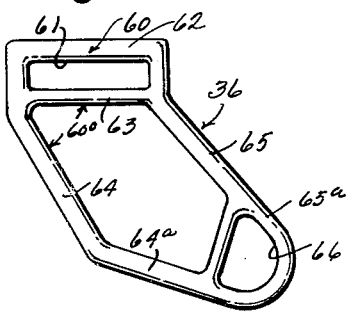

FIGURE 4ᵃ is a plan view of a rigid link connector utilized for the purpose of attachment of sling seat ends, leg straps and the lower ends of lift webs of the harness.

FIGURE 5 is a view of the opened pack container at the back of the wearer showing the release cable assemblage, fasteners and other details of the harness and pack, with the harness fastened upon the wearer.

FIGURE 6 is a side elevation of the harness and back pack as shown in FIGURE 5.

FIGURE 7 is a front elevation of the harness as it starts to detach from the wearer; the sling ends having been freed from the offset link connectors.

FIGURE 8 is a view showing the harness emergency pack and other equipment practically fully divested from the wearer; the view clearly designating the falling and pulling away of the harness from the front of the wearer to completely free the wearer of canopy, harness, packs, etc.

Figure 9:
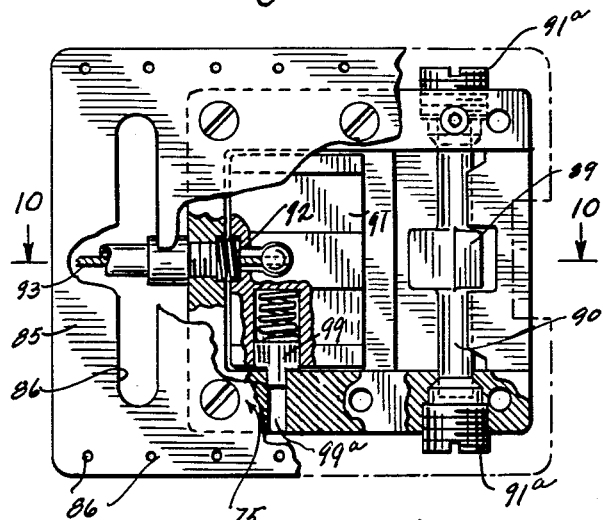

FIGURE 9 is a fragmentary plan view, partly in section, of one of the fastener boxes used to connect a harness fitting in place.

Figure 10:
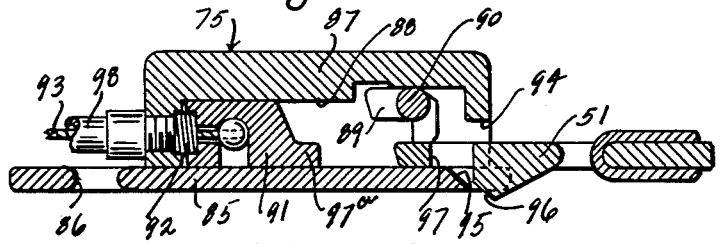

FIGURE 10 is a cross sectional view taken substantially on the line 10—10 of FIGURE 9, but with the harness web fitting being inserted into the fastener box.

Figure 11:
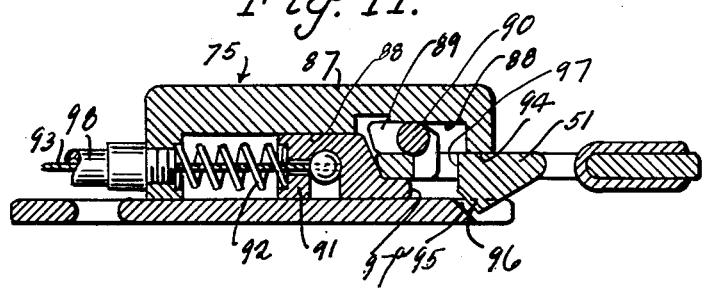

FIGURE 11 is a view showing the structural arrangement of the fastener box for holding the fitting locked in the fastener box.

FIGURE 12 is a fragmentary plan view, partly in section, showing a juncture box or assembly which controls simultaneous action of the fastener boxes.

FIGURE 13 is a side elevation of the juncture box of FIGURE 12.

FIGURE 14 is a fragmentary view, partly in section, showing a grip assembly which cooperates with the juncture box in enabling the wearer to simultaneously release the detents of the fastener boxes; this view being taken substantially on the line 14—14 of FIGURE 15.

FIGURE 15 is a side elevation of the grip assembly in released position.

Figure 16:
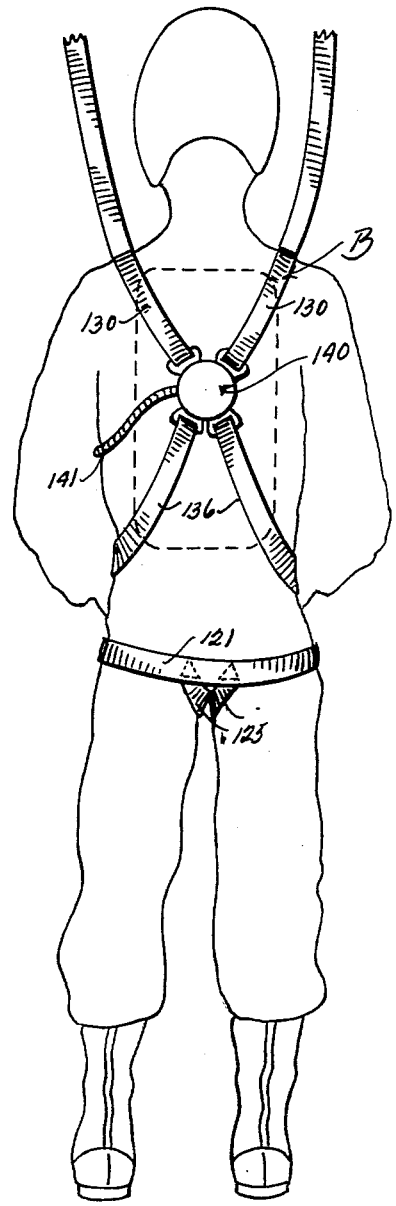

FIGURE 16 shows a rear elevation of a modified form of harness and quick release mechanism.

Figure 17:
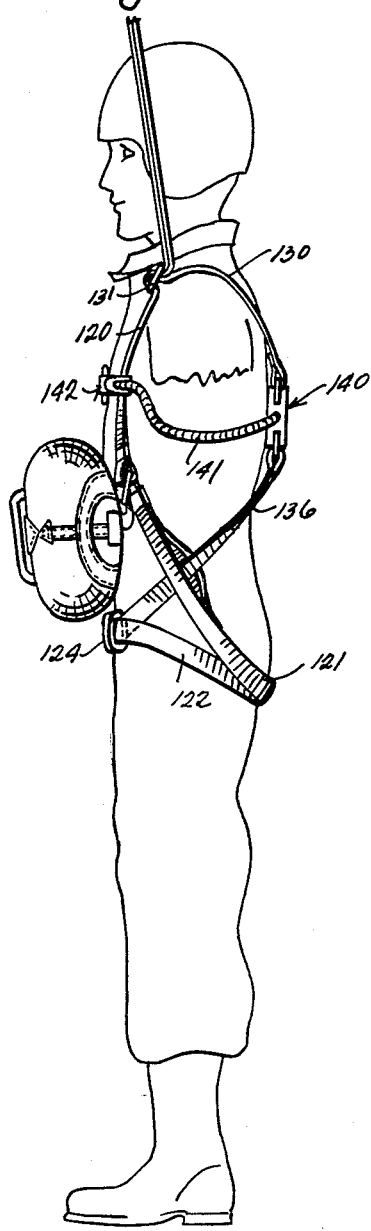

FIGURE 17 is a side elevation of the harness and release system shown in FIGURE 16.

Figures 18, 19:
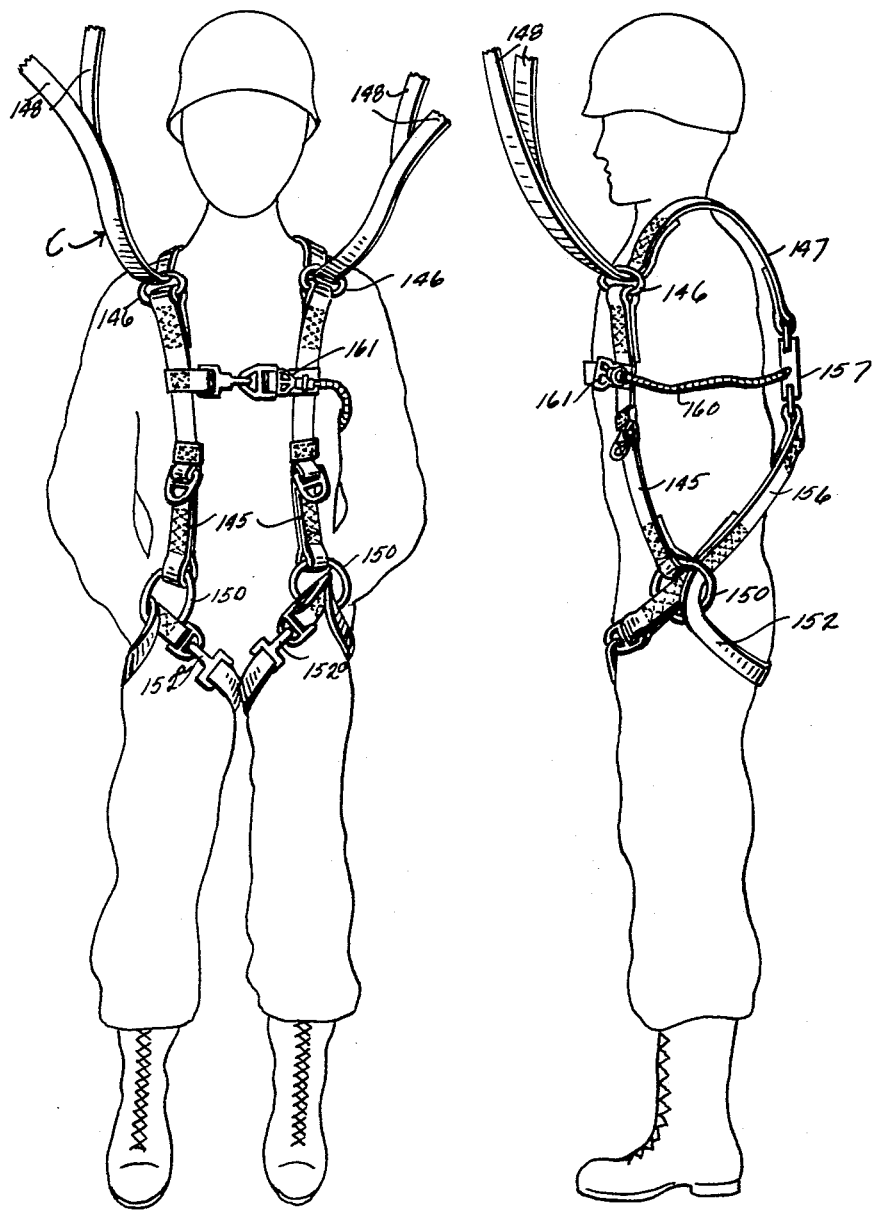

FIGURE 18 is a further modified form of harness and release unit shown in front elevation upon a wearer.

FIGURE 19 is a side elevation showing the harness of FIGURE 18 upon the wearer.

In the drawings, wherein similar reference characters designate corresponding parts throughout the several views, the letter A may generally designate the type of harness shown in FIGS. 1 to 15; B the type of harness shown in FIGS. 16 and 17, and C the type of harness shown in FIGS. 18 and 19.

The developed view of FIG. 2 shows the characteristic parts of the improved harness A which includes a flexible seat sling 20 of the type of flexible webbing (nylon or equal) conventionally used for seat slings. It may be reinforced in any approved manner. It includes an intermediate seat portion 21 to which right and left flexible leg straps 22 and 23 are secured as by stitching 24. The seat sling includes the right and left end portions 25 and 26 having fittings 27 and 28 at the ends thereof adapted to cooperate with fastener boxes of the assembly shown more particularly in FIG. 5.

The leg straps 22 and 23 are provided with conventional snap fasteners 30, having ring portions and movable bars 31 through which the adjusting ends of the straps 23 are threaded in a manner well known in the parachute harness art and more particularly shown in such U.S. patents as 2,516,004; 2,405,671; 2,192,083, and 2,542,044.

The harness A furthermore includes flexible right and left lift webs 32 and 33 the lower ends of which are doubled upon themselves and stitched at 34 being threaded through slots 61 of offset link connectors 36 the shape of which will be subsequently described. The ends of the sling seat 20 are adapted to be adjustably and releasably threaded through links 36. The lift webbing 32 and 33 are each provided with outstanding coupling rings 40 for detachably receiving the conventional emergency or reserve pack D; these rings 40 face forwardly and are normally positioned so that the emergency pack D externally positioned snap fasteners 42 can be quickly connected thereto in a manner well known in this art and more particularly described in U.S. Patent 2,157,504. The lift webs 32 and 33 extend upwardly and terminate in riser webs 43 and 44 respectively which extend upwardly and are connected to the shroud lines of the parachute canopy in a manner well understood in this art.

Right and left shoulder straps or webs 45 and 46 are connected by means of adjustable adapters 47 of well known construction mounted on the upper ends of the lift webs 32 and 33. Continuous with these shoulder straps 45 and 46 are right and left riser webs 48 and 49 which are complementary to the riser webs 43 and 44 for attachment to shroud lines of a parachute canopy. The adapters 47 are movable to conform the harness to the stature of the wearer. At the free ends of the shoulder straps 45 and 46 are located fittings 50 and 51 adapted to cooperate with fastener boxes of the release cable assembly in a manner to be subsequently described.

The lift webs 32 and 33 above the emergency pack connector rings 40 are connected together by a front breast strap construction 55 consisting of a length adjustable strap portion 56 to which an adjustable fitting 57 is attached for complementary use with a snap fastener 58 connected to a complementary breast strap portion 59 attached to the lift web 33 as shown in FIG. 2.

In general, the release assemblage of the form of invention A is constructed as part of the pack container. This releasably connects the sling and shoulder fittings 27, 28, 50 and 51 in position at the wearer's back. The harness is donned in the usual manner and the breast strap 55 adjusts to suit the stature of the wearer.

Figure 1:
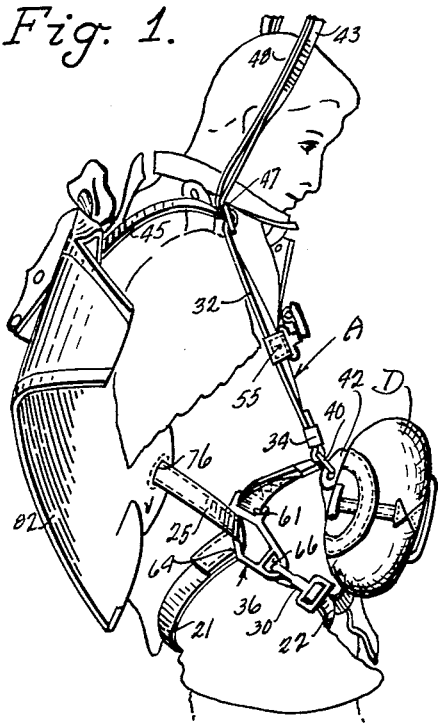
FIGURE 1 shows a side elevation of a wearer with the improved harness located on his body; the emergency or reserve pack being located on the harness and the back pack being shown fully opened with the riser webs extended upwardly at the sides of the wearer; the harness being shown in this position to support the wearer as during a jump.
Figure 3:
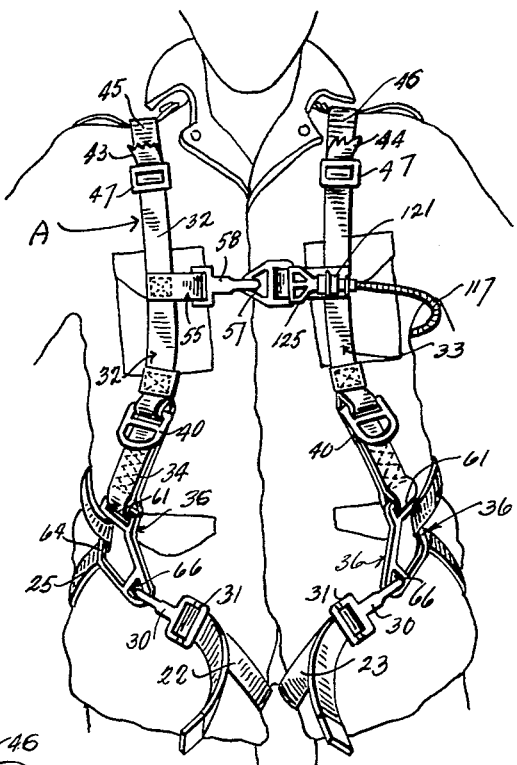
FIGURE 3 is a front elevation of the harness upon the wearer, with the emergency pack removed.

One very important feature of the invention is the provision of the rigid offset links 36 which are detailed in FIG. 4ᵃ. Each of these links consists of an upper portion 60 having an elongated opening 61 therethrough formed by the upper and lower bars 62 and 63 respectively. This is a straight line slot intended to receive the lower ends of the lift webs 32 and 33 therein, as shown in different views in the drawings. Usually this slot 61 is in horizontal position on the harness upon the wearer. The link 36, from the bar 63, is provided with spaced side bars 64 and 65 the lines of which are in acute angled relation with respect to the run of the slot 61, running either to the right or to the left, depending upon whether the link is for the right or left lift webbing. In FIG. 4ᵃ it is shown that the bars 63 tnd 64 are located at an angle of about 60° with respect to slot 61. The bar 64 at its lower end is continued at 64ᵃ, although in obtuse angled relation with respect thereto. The bars 65 and 64ᵃ terminate in a leg strap ring 65ᵃ having an opening 66 therein for receiving the snap fasteners 30 of the leg straps. It is shown in FIG. 1 that the bar portion 64 is upright when the harness is on a wearer and adapted to receive thereupon the end portions 25 or 26 of the sling seat in order to most naturally position said sling seat portion so that its ends may readily adjust themselves upon the links 36 and free themselves from the links 36 at the time of harness release action. The links 36 are toed inwardly at the front of the wearer as shown in FIG. 3 when in worn position, to enable a comfortable and natural attachment of the leg strap snap fasteners to the ring portions 65ᵃ.

The back pack container plays an important part in the formation of the harness structure, in that the back wall 70 thereof, which is usually frame reinforced, is provided with crossed flexible back strap webbing 71 and 72 which may be of the same formation as the other harness webs and stitched or secured to the wall 70 in any approved manner throughout the length thereof. These webs 71 and 72 at their upper and lower ends are permanently fastened to fastener boxes 75, which are preferably of the same construction. Each of the fasteners 75 includes a detent mechanism adapted to cooperate with the sling and shoulder fittings 27, 28, 50 and 51. The back wall of the container is provided with a marginally reinforced slot or opening 76 for each box 75 through which the ends 25, 26, 45 and 46 of the harness sling and shoulder straps are releasably extended, as shown in FIG. 5 for securement to the detents of the release boxes 75. It will thus be seen that the crossed straps 71 and 72 in reality form back straps for the rear structure of the harness A and are complementary to the sling and shoulder straps in providing a complete back structure for the harness.

The container of the pack includes snap fastener provided guard flaps 80 and 81, shown in FIG. 5 to cover the details of the back strap assembly and release assembly in order that it will not become entangled with the parachute canopy or shroud lines when packed in the container. Of course, the back wall 70 of the container is supplemented with releasable closure flaps 82 of usual construction.

The canopy and shroud lines are connected to the riser webs 43, 44, 48 and 49 in usual manner (not shown) and packed in conventional manner within the pack container upon the guard flaps 80 and 81 when shut.

Referring to FIGS. 9, 10 and 11, each of the fastener boxes 75 includes the attaching wall 85 provided with series of openings 86 at each side thereof for securement, as by stitching, to the foundation wall of the parachute pack container. This wall 85 has a slot 86, as shown in FIG. 9, through which the back straps 71 and 72 are threaded and secured thereto. The fastener mechanisms each include a casing 87 as a part of the box structure having a compartment 88 therein wherein a pivoted bell crank lever type of detent 89 is mounted on a shaft 90. The latter is swivelly secured in suitable bearing plugs 91ᵃ screw threaded in the casing 87 as shown in FIG. 9. The detent 89 is locked in holding position within the casing by means of a slide member 91 normally spring biased at 92 to move in the direction of the detent 89. The slide member 91 is provided with a flexible cable 93 by means of which its position may be varied against spring biasing, to the position shown in FIG. 10. The compartment 88 has an entrance 94 thereto having a cam edge 95. It will be noted that each one of the sling and shoulder fittings 27, 28, 50 and 51 is provided with a cam type projection 96, as shown in FIGS. 10 and 11. The releasing position of the fitting is shown in FIG. 10; the detent 89 being free to swing when in this position. The fitting is slid into the entrance 94 and is cammed upwardly so that the detent 89 enters the fitting opening 97, the slidable member 91 has a toe 97ᵃ which will lock the fitting and the detent in position (see FIG. 11) until the cable 93 is pulled to the position in FIG. 10, enabling the fitting to be released from the box. In this position a spring biased lock plunger 99 is forced into an opening 99ᵃ in order to lock the slide 91 in an inoperative position. The plunger 99 can be released by inserting a tool in opening 99ᵃ.

There are four of the fastener boxes 75 positioned on the parachute pack container, as shown in FIG. 5. Each box has a separate cable 93 housed within a flexible conduit 98.

The cables 93 are controlled from a single rigid juncture box designated at 100, shown in detail in FIGS. 12 and 13. This box 100 includes a casing structure provided with a base wall 101 having openings 102 marginally thereabout by means of which the same may be stitched, riveted or otherwise secured to the container wall 70 in the position shown in FIG. 5.

Further referring to the juncture box assemblage, the conduits 94 for the cables 93 are secured at 110 in a side wall of the box. Within the box there is located an operating lever 111 pivoted at 112 having swivelly connected thereto intermediate its ends at 113 a connecting member 114 the cross head 115 of which is provided with means thereon for securing the ends of the cables 93 thereto, as shown in FIG. 12. The lever 111 is operated by means of a single flexible cable 116 extended through a suitable sleeve 117 in the box. It leads to a suitable grip assemblage to be subsequently described. Pulling the cable 116 will operate all of the cables 93 and release the detents so that the fittings 27, 28, 50 and 51 will all simultaneously release. The cable 116 is housed in a conduit 117a as shown in FIG. 12.

A grip assemblage is provided as shown in FIGS. 14 and 15 for the operating cable 116. Such grip assemblage comprises a base plate 120 which may be stitched or riveted as at 121a on the front of one of the harness lift webs 33, in the position shown in the drawings. The plate 120 is provided with a housing structure 121 through which the cable slides and a sleeve plug 122a having an annular groove 122 therein. The hand grip 125 is of any approved construction, having a passageway 126 therethrough for slidably receiving the cable 116 which has a ball type retaining head 127 thereon slidable in a passageway 128 of the grip 125. The grip 125 is provided with a locking clip 130 the forward end of which is split at 131 and provided with crimps or indentations 132 adapted to rest in the annular groove 122 of the plug 122a. The grip assemblage of FIGS. 14 and 15 is shown in the detent releasing position. Normally the grip 125 has its split lock clip end inserted in the housing 121 and locked in the groove 122 when the fastener boxes have their detents in position to hold the harness fittings, as shown in FIG. 11. Normally the grip assumes the position shown in FIG. 3 when the detents are holding the fittings in the fastener boxes in locked positions. The opened position of the grip is shown in such views as FIGS. 4 and 7 after the wearer pulls the grip to release the detents. All of the cable conduits are preferably flexible to conform to the size of the wearer and of course the conduit 117 extends through suitable openings in the pack container for operating the juncture box as shown in FIG. 5.

The improved harness A has been designed to separate the sling from the upper part of the harness. This is possible because these parts are separable features, as shown in FIG. 2. At the time of pulling the grip 125 to release the detents and when the fittings have been released by the detents to positions shown in FIG. 4 and FIG. 7, the sling will be positioned to pass through links 36 (FIG. 7) and then forwardly between the wearer's legs; giving the wearer's body complete divesting freedom. The links 36 are an aid to separate the harness parts, so that the subject will be instantly freed of the harness under pull of the inflated parachute canopy. All of the harness parts move to the front of the wearer as shown in FIG. 8.

In the form of invention B shown in FIGS. 16 and 17, the lift webs 120 are at the right and left of the wearer extending downwardly to the rear to provide a sling 121. A division of the sling 121 at 122 extends forwardly for free extension through a link or strap 124 connected to the leg straps at each side of the wearer; the leg straps being shown in FIG. 16 at 125. The lift webs 120 and shoulder straps 130 adjustably extend through adapters 131 at the shoulders of the wearer. The straps 122 after threading through the links 124 extend upwardly as back straps 136 at each side of the wearer. The shoulder straps 130 project diagonally convergently downward to a quick release buckle 140 which is of the type having detents (not shown) adapted to be released by a cable (not shown) operating in a conduit 141 which may have a grip fitting 142 at the front of the wearer of the type shown in the form of invention A.

In the form of harness C shown in FIGS. 18 and 19 the lift webs 145 at their upper ends are provided with slide type adapters 146. The shoulder straps 147 slidably extend through these adapters and terminate in riser webs 148. Lift webs 145 at their lower ends are provided with link type loops 150 which may be rigid or of flexible thong material. The snap provided leg straps 152a slidably extend through these links 150 at each side of the harness and the sling seat 152 also extends through the links 150 in slidable manner and are connected with the upper portions of the leg straps. The shoulder straps 147 at the rear of the wearer in the upper ends of the back straps 156 are provided with fittings adapted to be retained by the detents of the quick release coupling 157. The cable for releasing the detents of coupling 157 extends through a conduit 160 and has a grip 161 on one of the riser webs which may be of the type shown for the form of invention A.

In the forms of harnesses B and C the detents release the strap fittings and the harness parts are pulled upwardly and forwardly, but of course in these types of harnesses the sling, due to its slide fittings, is laterally extended to the point where the same will pass over the wearer in an upward direction.

As will be apparent from the above, the parachutist dons the harness by using the simple chest and two leg straps. He then hangs the reserve chute on front of his harness in normal manner. In all types of harnesses the jumper upon actuation of the control grip egresses from the back and through the rear portion of the harness.

In the form of invention A it is possible to omit the use of back straps as part of the container by extending the lengths of shoulder strap and ends of the sling strap whereby the fittings 27, 28, 50 and 51 can be attached directly to the quick release box of the types shown in FIGS. 16 and 17.

Various changes in the size, shape and arrangement of parts may be made to the forms of invention herein shown and described without departing from the spirit of the invention or scope of the claims.

I claim:

1. In a quick divestible parachute harness the combination of a suspension strap sling in which the wearer sits during a parachute descent including strap end portions, side lift straps connected to said sling normally positioned at the front sides of the wearer, a breast strap connected to said side lift straps, a release to open said breast strap at the front of a wearer, leg strap means connected to said sling and side straps, upper shoulder straps including back strap portions connected upwardly to said side lift straps, riser straps connected to said shoulder and side lift straps normally adapted during a parachute descent to extend upwardly above and at the sides of the head of the wearer, and fastener means releasably connecting the sling strap end portions and back strap portions at the normal back of the wearer.

2. In a parachute harness the combination of a suspension strap sling in which the wearer normally sits during a parachute descent, lift straps connected to the sling, riser straps connected upwardly to the lift straps, breast strap means connecting said lift strap portions releasably together, leg strap means connected to said sling, and back strap means connected upwardly to said lift straps and downwardly to said sling and having fastener means associated therewith whereby the harness may be opened at the rear to permit the removal of the harness from a wearer in a forward direction.

3. In a quick divestible troop back personnel parachute harness a sling strap seat, lift straps having means for connecting the same to said sling seat, breast strap means connected to said lift straps including a releasable connection to permit a wearer to don the harness from the front thereof, leg straps means connected to said sling seat having means for releasably connecting the same to said lift straps, back strap means connected downwardly of the harness to said sling and upwardly to said lift straps, and fastener means for releasably connecting said back strap means together at the normal back of the wearer whereby upon opening of the back fastener means the harness may be removed from the wearer by movement of it in a forward direction with respect to the wearer.

4. In a parachute harness the combination of body incasing straps including a sling, leg strap means, lift straps and back straps, and fastener devices connected on both the lift straps and back straps whereby the harness may be opened at the front of the harness for donning purposes and opened at the back of the wearer and divested in a forward direction.

5. The parachute harness of claim 1 in which the fastener means at the normal back of the wearer has a releasing operating means located on the front of the harness.

6. The harness of claim 2 in which the fastener means last mentioned has a releasing operating means located on the front of the harness.

7. The harness of claim 3 in which the fastener means last mentioned has a releasing operating means located on the front of the harness.

8. The harness of claim 4 in which the fastener device at the back of the harness has an operating release on the front of the harness.

9. In a quick divestible parachute harness the combination of a body encasing harness having a front strap arrangement with releasable fastening means to open the harness at the front of a wearer, and back strap means including releasable fastening means to open the harness at the back of the wearer for release of the harness from the wearer.

10. A parachute harness as described in claim 9 in which operating means for the back strap fastening means extends from the back of the wearer with an operating connection upon the front strap means.

11. In a quick divestible parachute harness the combination of a sling seat having end portions adapted for extension around the sides and to the rear of the wearer and having fittings at the ends thereof, front lift straps having adapters at the lower ends thereof through which the end portions of the sling are freely slidable and detachable with respect thereto, leg straps connected to the medial portion of the sling having snap fasteners at the ends thereof, said adapters at their lower ends having means to permit detachable connection of the snap fasteners of the leg straps thereto, a front breast strap connected to said lift straps having means to detachably open the same, shoulder straps having back strap ends, adapter means connecting the shoulder straps to the upper ends of the lift straps, said shoulder straps at the free ends thereof having fittings, and back fastener means to releasably connect the fittings of the ends of the sling and said shoulder straps thereto.

12. A harness as described in claim 11 in which a pack container is provided having a foundation wall provided with back strap portions connected thereon, said back strap portions having fasteners at the upper and lower ends of each for releasable connection of the fittings of the sling thereto, and an operating means for releasably operating said fasteners.

13. In a divestible harness for parachutists, the combination of front lift straps having loop type links connected at the lower ends thereof, a sling strap having free ends detachably slidably looped through said links, the ends of the sling having fittings thereon, shoulder straps connected to the lift straps including back portions having fittings at the ends thereof, and fastener means for releasably connecting all of the fasteners above mentioned together at the rear of the harness.

14. A harness as described in claim 13 in which a breast strap is connected at its ends to said lift straps at the upper portions thereof, said breast strap comprising two parts and means to detachably connect said parts together.

15. In a divestible harness the combination of spaced lift webs, an elongated offset link connected at the lower end of each lift web and toed inwardly at the front of the harness at the lower ends thereof, each link having an opening therein, a sling having free back strap ends and an intermediate seat portion, said back strap ends being freely slidable and detachable through the openings of the links and at the ends thereof having fittings, leg straps connected to the intermediate portion of the seat of the sling having at the ends thereof snap fasteners for detachable connection with the toed in lower ends of said links, shoulder strap means connected to the lift webs terminating in lower back strap ends having fittings at the free ends thereof, and means to releasably connect all of said above mentioned fittings together at the rear of the harness.

16. In a parachute pack the combination of a container having a foundation wall, back straps attached to the inside of the foundation wall having free ends terminating in the pack container and attached to the container, fastener boxes having movable detents therein mounted on said container, said container foundation wall having openings therethrough for the threading therein of harness fittings into said fastener boxes, a juncture box mounted on said foundation wall, flexible cables connected in said juncture box and secured to and along said back straps for operating the detents of the fastener boxes, and operating means in the juncture box including a single pull cable for simultaneously operating all the cables leading to said fastener boxes.

17. The pack described in claim 16 in which said straps are in crossed relation upon said foundation wall.

18. In a divestible harness the combination of a body encasing harness including front strap means, lower back straps and upper shoulder straps adapted to extend over the shoulders and along the back of a wearer, said lower straps and shoulder straps having fittings at the ends thereof, a back pack container having a foundation wall with openings through which the ends of the shoulder and lower straps are threaded to place said fittings at the inside of the foundation wall, complementary straps secured to the foundation wall and extending between the ends af said shoulder and lower strap fittings, and fastener boxes having detent means therein for releasable connection with the fittings of said strap ends.

19. The harness and pack described in claim 18 in which a juncture box is mounted on the pack foundation wall at the inside thereof, cables leading from said juncture box to the individual fastener boxes for operating the detents thereof, and means in the juncture box for operating all of said cables simultaneously including a single operating cable connected to the front strap means of the harness.

20. The harness and pack described in claim 19 in which the harness front strap means includes front lift straps and leg straps, leg strap means to releasably connect the leg straps to the lift straps at the front of the wearer, and a breast strap means connecting the lift straps having a coupling therein to open the same at the front of the harness.

21. In a quick divestible parachute the combination of front body straps having means connected to the said straps at the front of the harness to enable the donning of the harness from the front, and side and back strap means connected to said front straps including a quick release single point connector connecting the back strap means together at the rear of the wearer for release detachment in order to divest the harness from the wearer.

References Cited by the Examiner
UNITED STATES PATENTS

| | | | |
|---|---|---|---|
| 645,845 | 3/00 | Barnett | 24—74 |
| 873,445 | 10/07 | Maltby | 24—74 |
| 2,107,184 | 2/38 | Lasker | 74—501 |
| 2,160,113 | 5/39 | Anderson | 74—501 |
| 2,882,581 | 4/59 | Spielman | 24—230 |
| 2,986,362 | 5/61 | Gimalouski | 244—151 |
| 2,989,274 | 6/61 | Moran | 244—151 |
| 3,003,213 | 10/61 | Rogers | 24—230 |

FERGUS S. MIDDLETON, *Primary Examiner.*